United States Patent
Reuss et al.

(10) Patent No.: US 8,586,945 B2
(45) Date of Patent: Nov. 19, 2013

(54) FLUORESCENCE LIGHT SCANNING MICROSCOPE HAVING A BIREFRINGENT CHROMATIC BEAM SHAPING DEVICE

(75) Inventors: Matthias Reuss, Heidelberg (DE); Johann Engelhardt, Bad Schoenborn (DE)

(73) Assignee: Deutsches Krebsforschungszentrum, Heidelberg (DE)

( * ) Notice: Subject to any disclaimer, the term of this patent is extended or adjusted under 35 U.S.C. 154(b) by 212 days.

(21) Appl. No.: 13/297,872

(22) Filed: Nov. 16, 2011

(65) Prior Publication Data
US 2012/0104279 A1  May 3, 2012

Related U.S. Application Data

(63) Continuation-in-part of application No. PCT/EP2010/056987, filed on May 20, 2010.

(30) Foreign Application Priority Data

May 20, 2009  (DE) ................. 20 2009 007 250 U

(51) Int. Cl.
*G01J 1/58* (2006.01)

(52) U.S. Cl.
USPC ...................................... 250/458.1

(58) Field of Classification Search
USPC .......................... 250/458.1, 459.1
See application file for complete search history.

(56) References Cited

FOREIGN PATENT DOCUMENTS

| WO | 2006/108526 A1 | 10/2006 |
|---|---|---|
| WO | 2008/145371 A2 | 4/2008 |
| WO | 2009/047189 A2 | 4/2009 |

OTHER PUBLICATIONS

S. W. Hell, and J. Wichmann, "Breaking the diffraction resolution limit by stimulated emission: stimulated-mission-depletion fluorescence microscopy," Opt. Lett. 19(11), 780-782 (1994).

T. A. Klar, S. Jakobs, M. Dyba, A. Egner, and S. W. Hell, "Fluorescence microscopy with diffraction resolution barrier broken by stimulated emission," Proc. Natl. Acad. Sci. U.S.A. 97(15), 8206-8210 (2000).

E. Betzig, G. H. Patterson, R. Sougrat, O. W. Lindwasser, S. Olenych, J. S. Bonifacino, M. W. Davidson, J. Lippincott-Schwartz, and H. F. Hess, "Imaging intracellular fluorescent proteins at nanometer resolution," Science 313(5793), 1642-1645 (2006).

M. J. Rust, M. Bates, and X. W. Zhuang, "Sub-diffraction-limit imaging by stochastic optical reconstruction microscopy (STORM)," Nat. Methods 3(10), 793-795 (2006).

(Continued)

*Primary Examiner* — Mark R Gaworecki
(74) *Attorney, Agent, or Firm* — Thomas | Horstemeyer, LLP

(57) ABSTRACT

A fluorescence light scanning microscope (2) comprises a light source providing excitation light (8) for exciting a fluorophore in a sample to be imaged for spontaneous emission of fluorescence light, and suppression light (7) for suppressing spontaneous emission of fluorescence light by the fluorophore on a common optical axis (4), the suppression wavelength differing from the excitation wavelength; an objective (19) focusing both the excitation (8) and the suppression (7) light to a focus point; a detector (21) detecting fluorescence light (11) spontaneously emitted by the fluorophore; and a chromatic beam shaping device (1) arranged on the common optical axis (4), and including a birefringent chromatic optical element (3) adapted to shape a polarization distribution of the suppression light (7) such as to produce an intensity zero at the focus point, and to leave the excitation light such as to produce a maximum at the focus point.

22 Claims, 7 Drawing Sheets

(56) References Cited

OTHER PUBLICATIONS

M. G. L. Gustafsson, "Surpassing the lateral resolution limit by a factor of two using structured illumination microscopy," J. Microsc. 198(Pt 2), 82-87 (2000).

G. Donnert, J. Keller, R. Medda, M. A. Andrei, S. O. Rizzoli, R. Lührmann, R. Jahn, C. Eggeling, and S. W. Hell, "Macromolecular-scale resolution in biological fluorescence microscopy," Proc. Natl. Acad. Sci. U.S.A. 103(31), 11440-11445 (2006).

V. Westphal, and S. W. Hell, "Nanoscale resolution in the focal plane of an optical microscope," Phys. Rev. Lett. 94(14), 143903 (2005).

E. Rittweger, K. Y. Han, S. E. Irvine, C. Eggeling, and S. W. Hell, "Sted microscopy reveals crystal colour centres with nanometric resolution," Nat. Photonics 3(3), 144-147 (2009).

D. Wildanger, R. Medda, L. Kastrup, and S. W. Hell, "A compact STED microscope providing 3D nanoscale resolution," J. Microsc. 236(1), 35-43 (2009).

S. W. Hell, "Far-field optical nanoscopy," Science 316(5828), 1153-1158 (2007).

J. Keller, A. Schönle, and S. W. Hell, "Efficient fluorescence inhibition patterns for RESOLFT microscopy," Opt. Express 15(6), 3361-3371 (2007).

B. Harke, J. Keller, C. K. Ullal, V. Westphal, A. Schönle, and S. W. Hell, "Resolution scaling in STED microscopy," Opt. Express 16(6), 4154-4162 (2008).

D. Wildanger, E. Rittweger, L. Kastrup, and S. W. Hell, "STED microscopy with a supercontinuum laser source," Opt. Express 16(13), 9614-9621 (2008).

N. Bokor, Y. Iketaki, T. Watanabe, and M. Fujii, "Compact fluorescence depletion microscope system using an integrated optical element," Opt. Commun. 281(7), 1850-1854 (2008).

R. Menon, P. Rogge, and H.-Y. Tsai, "Design of diffractive lenses that generate optical nulls without phase singularities," J. Opt. Soc. Am. A 26(2), 297-304 (2009).

D. Wildanger, J. Bückers, V. Westphal, S. W. Hell, and L. Kastrup, "A STED microscope aligned by design," Opt. Express 17(18), 16100-16110 (2009).

G. Machavariani, Y. Lumer, I. Moshe, A. Meir, and S. Jackel, "Efficient extracavity generation of radially and azimuthally polarized beams," Opt. Lett. 32(11), 1468-1470 (2007).

M. Dyba, J. Keller, and S. W. Hell, "Phase filter enhanced STED-4Pi fluorescence microscopy: theory and experiment," N. J. Phys. 7, 134 (2005).

N. Bokor, Y. Iketaki, T. Watanabe, K. Daigoku, N. Davidson, and M. Fujii, "On polarization effects in fluorescence depletion microscopy," Opt. Commun. 272(1), 263-268 (2007).

V. Westphal, C. M. Blanca, M. Dyba, L. Kastrup, and S. W. Hell, "Laser-diode-stimulated emission depletion microscopy," Appl. Phys. Lett. 82(18), 3125-3127 (2003).

P. Török, and P. Munro, "The use of Gauss-Laguerre vector beams in STED microscopy," Opt. Express 12(15), 3605-3617 (2004).

I. Testa, A. Schönle, C. von Middendorff, C. Geisler, R. Medda, C. A. Wurm, A. C. Stiel, S. Jakobs, M. Bossi, C. Eggeling, S. W. Hell, and A. Egner, "Nanoscale separation of molecular species based on their rotational mobility," Opt. Express 16(25), 21093-21104 (2008).

M. A. Lieb, J. M. Zavislan, and L. Novotny, "Single-molecule orientations determined by direct emission pattern imaging," J. Opt. Soc. Am. B 21(6), 1210-1215 (2004).

M. Böhmer, and J. Enderlein, "Orientation imaging of single molecules by wide-field epifluorescence microscopy," Opt. Soc. Am. B 20(3), 554-559 (2003).

P. Dedecker, B. Muls, J. Hofkens, J. Enderlein, and J. I. Hotta, "Orientational effects in the excitation and deexcitation of single molecules interacting with donut-mode laser beams," Opt. Express 15(6), 3372-3383 (2007).

D. Patra, I. Gregor, and J. Enderlein, "Image Analysis of Defocused Single-Molecule Images for Three-Dimensional Molecule Orientation Studies," J. Phys. Chem. A 108(33), 6836 (2004).

T. Ha, T. Enderle, S. Chemla, R. Selvin, and S. Weiss, "Single molecule dynamics studied by polarization modulation," Phys. Rev. Lett. 77(19), 3979-3982 (1996).

B. Sick, B. Hecht, and L. Novotny, "Orientational imaging of single molecules by annular illumination," Phys. Rev. Lett. 85(21), 4482-4485 (2000).

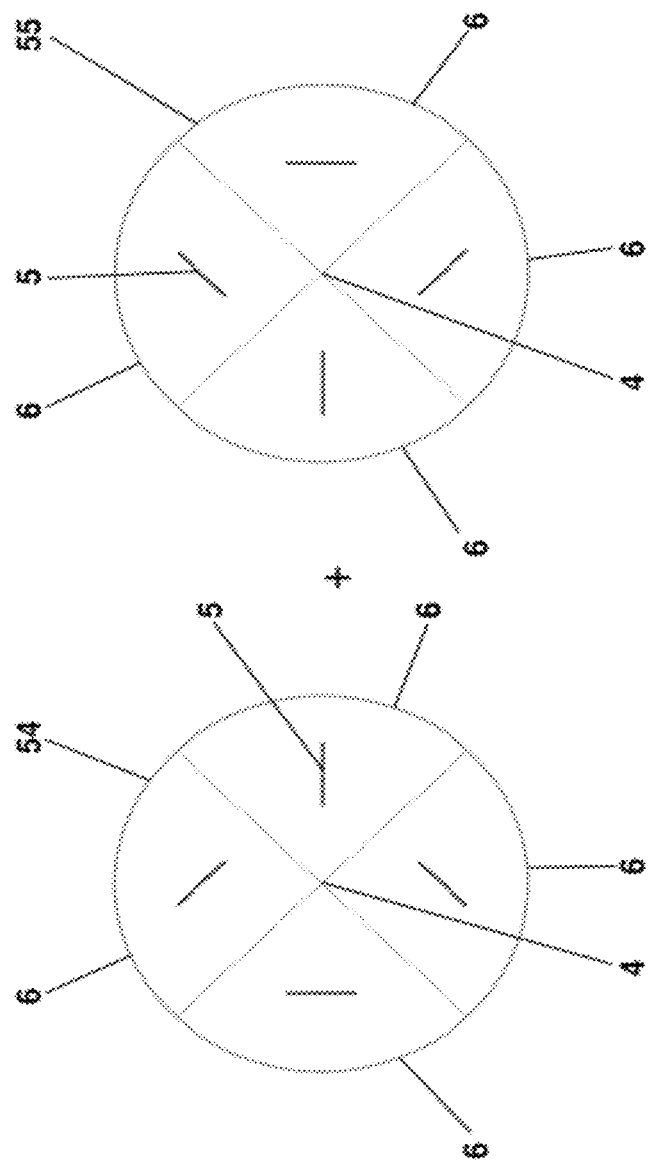

FLUORESCENCE LIGHT SCANNING MICROSCOPE HAVING A BIREFRINGENT CHROMATIC BEAM SHAPING DEVICE

CROSS REFERENCE TO RELATED APPLICATIONS

This application is a continuation in part of International Patent Application PCT/EP2010/056987 filed on May 20, 2010 and claiming priority to German Utility Model DE 20 2009 007 250.9 entitled "Feldveränderungsmittel zur Erzeugung komplementärer Lichtintensitätsmuster", filed on May 20, 2009, and registered on Nov. 26, 2009.

FIELD OF THE INVENTION

The invention relates to a fluorescence light scanning microscope. More particular the invention relates to a fluorescence light scanning microscope in which a beam of excitation light for exciting a fluorophore in a sample to be imaged for spontaneous emission of fluorescence light, and a shaped beam of suppression light for suppressing spontaneous emission of fluorescence light by the fluorophore are focused into a focus volume around a focus point, the beam of suppression light being shaped such as to produce an intensity distribution of the suppression light around the focus point having an intensity zero at the focus point, and the beam of excitation light producing an intensity distribution of the excitation light around the focus point having a maximum at the focus point, and in which a detector detects fluorescence light spontaneously emitted by the fluorophore. Even more particular, the invention relates to a STED microscope.

BACKGROUND OF THE INVENTION

Fluorescence microscopy is one of the most extensively used tools for the structural and functional investigation of the interior of cells. Its popularity has steadily grown despite the fact that it notoriously fails to image structures smaller than about half the wavelength of light (~200 nm), i. e. that it is limited by the so called diffraction barrier. While electron, X-ray, and scanning probe microscopy offer a substantially better spatial resolution, they all fall short in imaging intact or even living cells in three dimensions (3D). The invention of Stimulated Emission Depletion Microscopy (STED) in 1994 highlighted the then unexpected fact that the diffraction barrier to the spatial resolution can be effectively overcome in a microscope that uses regular lenses and focuses visible light [1,2]. Other subdiffraction resolution techniques, such as PALM, STORM and structured illumination have since emerged as well [3-5]. STED microscopy currently provides nanometer scale resolution [6-8] in biological and non-biological samples, while retaining most of the advantages of far-field optical operation, such as the ability to non-invasively image cells in 3D [9].

While the principles of scanning STED microscopy do not rest on those of the confocal microscope, STED can be implemented in a scanning confocal microscope to great effect. To this end, one overlaps the focused excitation beam of a scanning (confocal) microscope with a donut-shaped STED beam [10,11], whose role is to keep fluorophores dark even when they are exposed to excitation photons, and which is a particular embodiment of the beam of suppression light referred to above. The fluorophores remain dark, because the wavelength and the intensity of the STED beam are adjusted such as to instantly de-excite potentially excited fluorophores by stimulated emission. Consequently, fluorophores subject to a STED beam of intensity $I>3\ I_S$ are practically confined to the ground state and hence switched off. This is a consequence of the fact that the normalized probability of the molecule to spend time in the excited state follows $\sim\exp(-I/I_S)$, with $I_S$ being a characteristic of the molecule. Any molecule subject to $I \gg I_S$ is deprived of its ability to fluoresce, because the fluorescent state is disallowed by the presence of the STED beam. Since I increases from the center of the donut on outwards to the donut crest, the probability for a molecule to be off is highest at the donut crest. Molecules located at the donut center remain fluorescent. At a certain distance from the center where $I>3\ I_S$, practically all molecules (95%) will be off. Since the threshold $3\ I_S$ can be moved towards the center by increasing the overall intensity of the STED-beam, the region in which the fluorophores are still capable of signalling can be decreased far below the physical width of the donut minimum, i.e. far below the diffraction barrier.

Specifically, for a wavelength $\lambda$ and a numerical aperture NA of the objective lens, the spot in which the fluorophores are able to signal will have a diameter $d \approx \lambda/(2\ NA\ (1+I_m/I_S)^{1/2})$ [7,12]. $I_m$ is the intensity of the STED-beam at the donut crest. $I_S$ is usually of the order of 1 to 10 MW/cm². Scanning the two overlapped beam reveals structures at a spatial resolution of d, because the signal of fluorophores that are further apart than d are recorded sequentially in time. With several current dyes, d can thus be shrunk down to ~20 nm [6,7]; for a certain class of inorganic fluorophores (crystal color centers) even 5.8 nm have been reported [8].

An important point in setting up and operating a STED microscope is beam alignment. For maximum performance, the donut should be centered on the excitation spot with deviations <50 nm. Furthermore, the beam alignment should be stable over the course of a measurement and over an adequate field of view. While this is not an obstacle in principle, given that in standard multi-color confocal microscopes several beams are superimposed with a comparable precision, too, it is desirable to improve stability and ease of operation by having pre-aligned beams. Intrinsic alignment can be achieved by using a common laser source for both the excitation and the depletion beam. This can be accomplished by coupling two separate lasers into a common optical fiber or, even more conveniently, by using a super-continuum light source [13]. However, having pre-aligned beams requires a beam shaping device that leaves the excitation wavelength unaffected, while treating the STED wavelength in such a way that it forms a donut. Current donut-shaping devices however use a vortex phase mask and cannot sufficiently distinguish between wavelengths. They also forge the excitation beam into something close to a donut and are thus not suitable for the use with pre-combined beams. The solution suggested in [14] relies on the annular separation of pre-aligned beams but blocks a considerable amount of STED light. The method proposed in [15] has, up our knowledge, not been realized in practice so far.

More recently, Wildanger et al. [16] proposed a scheme that relies on the different dispersion properties of different optical materials. By selecting two optical glasses whose refractive indices match at the excitation wavelength but differ for the STED wavelength, they were able to design a phase plate that can be shared by both beams. In this scheme, however, the detection beam path is coupled out between the objective lens and the phase plate using a dichroic mirror.

In general, the same points listed above as relevant to STED microscopy also apply to GSD (Ground State Depletion) microscopy. In GSD microscopy the beam of suppression or depletion light depletes the ground state of the fluorophore out of which it is excitable for fluorescence by the excitation light in that the fluorophore is transferred into a dark state which can be a triplet state for example.

International Patent Application Publication WO 2008/145371 A2 proposes an optical assembly for use in STED and GSD microscopy which comprises an objective for projecting two optically different light components into a projection space, and an optical component that selectively deforms wave fronts of one of the light components passing through such that the intensity distribution of the one of the light components in the projection space, due to interference with itself, differs from the intensity distribution of the corresponding other light component in the projection space, the wave fronts of both light components as well as light emitted out of the projection space and collected by the objective passing through the optical component. The two light components may differ in wavelength and/or polarization.

SUMMARY OF THE INVENTION

The present invention provides a fluorescence light scanning microscope which comprises a light source providing a beam of excitation light of an excitation wavelength for exciting a fluorophore in a sample to be imaged for spontaneous emission of fluorescence light, and providing a beam of suppression light of a suppression wavelength for suppressing spontaneous emission of fluorescence light by the fluorophore on a common optical axis of the beams of excitation light and suppression light, the suppression wavelength differing from the excitation wavelength; an objective focusing both the beam of excitation light and the beam of suppression light into a focus volume around a focus point; a detector adapted to detect fluorescence light spontaneously emitted by the fluorophore; and a chromatic beam shaping device arranged on the common optical axis of the beams of excitation light and suppression light, and including a chromatic optical element adapted to shape the beam of suppression light such as to produce an intensity distribution of the suppression light around the focus point having an intensity zero essentially at the focus point, and to leave the shape of the excitation light such as to produce an intensity distribution of the excitation light around the focus point having a maximum essentially at the focus point, wherein the chromatic optical element includes a birefringent chromatic optical element adapted to shape the polarization distribution of the beam of suppression light over its beam cross section.

Other features and advantages of the present invention will become apparent to those skilled in the art upon examination of the following drawings and the detailed description. It is intended that all such additional features and advantages be included herein within the scope of the present invention, as defined by the claims.

SHORT DESCRIPTION OF THE DRAWINGS

The invention will be better understood with reference to the following drawings. The components in the drawings are not necessarily to scale, emphasis instead being placed upon clearly illustrating the principles of the present invention. In the drawings, like reference numerals designate corresponding parts throughout the several views.

In the following descriptions the term "segment" or "segmented" is particularly used for sectors of circle or pie shaped areas or for ring shaped elements. An expert in the field of optics, however, will immediately notice that also other, in general arbitrarily shaped subdivisions of the beam cross section will lead to similar results if proper areas, local intensities and polarization directions are used.

In this document, the explicit descriptions refer to a single focus region with a maximum intensity of the excitation beam and an intensity zero essentially at the same position in the focal region. It is obvious for an expert in the field of optics that the invention is advantageously combined with multiple spot arrangements, for example such as disclosed in International Patent Application published as WO/2006/108526, which are able to generate multiple copies of the beams generated in the new fluorescence light scanning microscope.

Furthermore, the new fluorescence light scanning microscope is not restricted to spot shaped intensity zeros of the suppression beam but rather to any other essentially complementary intensity patterns of the excitation and suppression beams which can be thought as a collection of spots and minima. In that sense, for example, a line would be formed by a set of adjacent spots accompanied by corresponding adjacent zeros. Just to give one simple example here: an expert in the field of fluorescence light scanning microscopy will immediately be enabled by the present disclosure to use half circle shaped birefringent chromatic elements to generate line shaped intensity maxima and zeros in the focal region.

In the context of the new fluorescence light scanning microscope the term "zero" or "intensity zero" of the suppression light shall not be understood in a mathematically exact sense. Instead, it is a low, preferably an as low as possible, intensity which is experimentally producible, and which is typically on the order of a few percent or below of the surrounding intensity of the suppression light. Typically an intensity zero of 1% of the surrounding intensity of the suppression light is achievable with moderate effort and produces good results, i. e. only very little unwanted suppression of the spontaneous emission of fluorescence light from the fluorophore in the intensity zero.

FIG. 1 shows a schematic setup of a new STED microscope using a birefringent beam shaping device directly in the back of its objective. Center: principle beam path. A beam of excitation light (bold) and a beam of suppression light (STED-beam) (outlined), as well as emitted fluorescence light (dashed) pass the beam shaping device. Preferably, STED and excitation light are provided by the same source to facilitate intrinsic beam alignment. Left side: Schematic drawing of the beam shaping device, consisting of three wave plates, where the last two wave plates can be combined into a single segmented one, as indicated. Right: polarization state of the beam of excitation light (bold) and of the beam of suppression light (STED-beam) (outlined) at different stages in the beam shaping device and at two representative points of the wave cycle. The two beams are treated differently due to the chromatic nature of the segmented wave plate. The STED beam will focus to a donut, whereas the beam of excitation light leaves the device circularly polarized, rendering a normally focused light spot.

FIG. 2 indicates an effect of the STED beam on a fluorescent molecule with different polarization distributions over the beam cross section according to easySTED (a), and Molecular Orientation STED Microscopy (MOM-STED) (b, c). (a): Polarization distribution in the STED-donut for phases 0 and $\pi/2$ (top row), and the resultant effective STED beam focal spot (STED-PSF) in the second row, taking into account the projection of the STED-field onto the dipole. The effective STED PSFs for $\phi=0$ and $\phi=\pi/2$ complement each other and lead to high resolution in all directions. (b): with MOM-STED, the resulting effective STED PSF is the same for all $\phi$ and resolution enhancement is parallel to the dipole only. In (c), a molecule with different orientation is shown; also in this case, the molecule is subject to the STED field only in those regions where the STED-field is parallel to the dipole. It can be seen that with MOM-STED this is always the case in a direction perpendicular to the dipole, regardless of its actual orientation.

FIG. 3 illustrates STED beam shaping with a segmented chromatic λ/2 plate. Left: focal intensity distributions of the beam of excitation light (top) and the STED beam (bottom). Both beams have passed the easySTED beam shaping device simultaneously. The 647 nm-STED beam becomes a donut, while the 532 nm excitation beam is focused to a regular spot. Right: line profiles along the direction indicated by the arrows on the left.

FIG. 4 illustrates the resolution enhancement achieved in the new STED microscope with easySTED. Fluorescent beads imaged in standard confocal mode (left) and with high-resolution easySTED (center). The plot (right) shows a line profile along the arrows indicated in the central easySTED image together with a double Gaussian fit. Scale bar=500 nm; count rates are in counts/200 µs dwell time.

FIG. 5 shows images of biological samples taken with the new STED microscope. The protein bassoon in hippocampal mouse neurons observed in standard confocal mode (left). In contrast, easySTED (center) reveals detail unobservable in the confocal image. Both images show raw data. Right: profiles along the lines indicated by arrows in the easySTED image together with Gaussian fits reveal a resolution below 40 nm. Scale bars are 1 µm, count rates are in counts/200 µs dwell time.

FIG. 6 shows images of nile red fluorescent beads bleached down to almost single molecule level taken with the new STED microscope in a Molecular Orientation Microscopy (MOM) mode. The resolution with STED is enhanced only in directions perpendicular to the dipole of the molecule, as is evident from the magnification on the right. The molecules being mostly vertically aligned is a result of the linearly polarized excitation beam that preferably acts on molecular transition dipoles along this direction. Arrow: three molecules can be separated even in a sub-STED focal volume solely by the fact that their resulting spot differs in orientation. Scale bars are 500 nm, count rates are in counts/1000 µs dwell time.

Figure 10:
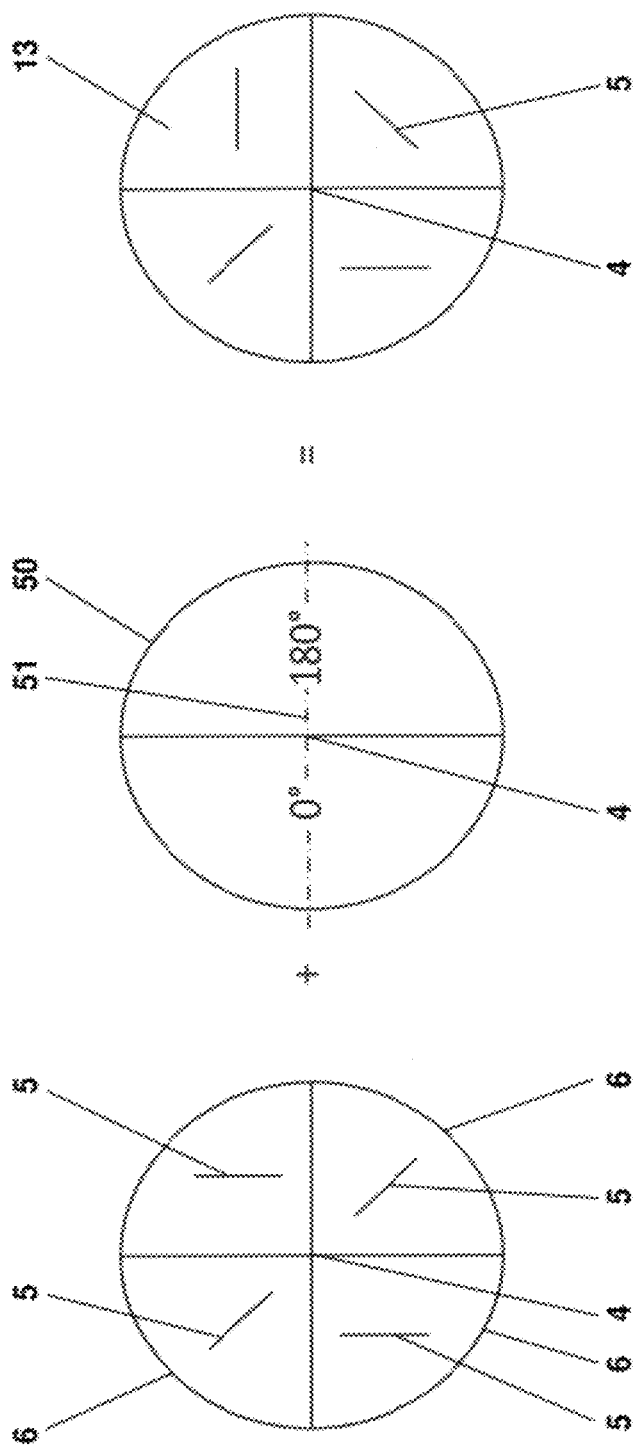

FIG. 10 indicates a stack of a segmented birefringent achromatic λ/2 plate having four pie segments and of a non birefringent chromatic plate segmented in two halves.

Figure 11:
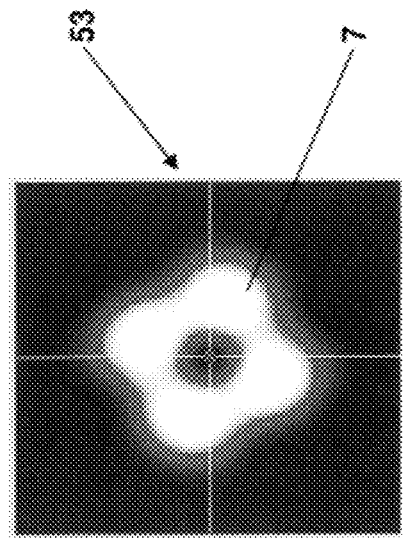
Figure 11:
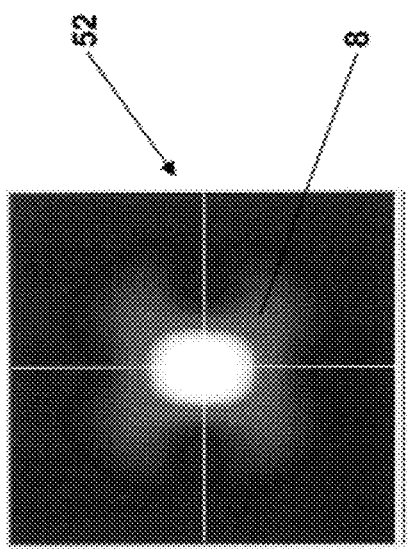

FIG. 11 depicts the intensity distribution of excitation light (a) and suppression light (b) shaped by the stack according to FIG. 10; and FIG. 12 indicates a stack of two segmented birefringent chromatic λ/2 plates of opposite chromatic dispersion.

DETAILED DESCRIPTION

Even if the invention will be described by particular reference to a STED microscope in which the STED beam is the beam of suppression light in the following, the invention is not limited to STED microscopes but also relates to all other fluorescence light scanning microscopes using a beam of suppression light in addition to a beam of excitation light, like, for example GSD-microscopes or other RESOLFT techniques [10].

The new fluorescence light scanning microscope comprises a beam shaping device that stands out by the fact that it does not rely on introducing phase differences, but rather on modifying the polarization across the cross section of the beam of suppression light. Working with polarization, one can advantageously use birefringent crystals which are commercially available in high quality as low order optical retarders. Preferably the chromatic characteristics of a low order wave plate exactly match the spectral separation of the excitation and the STED-beam. Thus, the birefringent chromatic optical element of the new fluorescence light scanning microscope provides for a simple, error proof and easy-to-use beam-shaping device that, together with an appropriate laser source, can economically retrofit almost any standard scanning fluorescence microscope, particularly if provided with a confocal detection arrangement, and turn it into a full STED microscope providing subdiffraction resolution. Such a retrofitted scanning confocal fluorescence microscope will in the following be designated as easySTED.

Furthermore, with a minor change, the same beam shaping device can be tuned so that the image of a single fluorophore depends strongly on the fluorophore's transition dipole orientation. As a result, this Molecular Orientation Microscopy by STED (MOM-STED) allows one to assess the orientation of the transition dipole of the molecule in space. Most intriguingly, the orientation of the molecule is directly reproduced in the image by a (line shaped) fluorescence patch. In addition, by sensing subtle changes in molecular orientation, this simple yet powerful version of STED microscopy improves the recognition and hence separation of adjacent individual fluorophores. By the same token, MOM-STED also allows one to improve counting of molecules within subdiffraction sample volumes.

The birefringent chromatic optical element of the fluorescence light scanning microscope may comprise a segmented chromatic λ/2 plate including segments featuring different orientations of their fast axis. To produce such a segmented wave plate, a standard wave plate which is available in high quality may simply be cut in segments with the desired orientation of their fast axis. These individual segments may simply be attached or cemented to each other. Preferably, however, the segments are cemented side by side onto a common substrate.

The chromaticity of the segmented wave plate ensures that it only changes the polarization of the beam of suppression light whereas it leaves the polarization of the beam of excitation light essentially untouched. The beam shaping device of the new fluorescent light scanning microscope may include an achromatic wave plate also changing the polarization of the beam of excitation light, i. e. an achromatic wave plate. However, there is at least one birefringent chromatic optical element which is preferably made as a segmented chromatic wave plate. Even more preferably it is a segmented chromatic λ/2 plate.

The segmented chromatic λ/2 plate may include pie segments tapering towards the common optical axis which have a same size and a same difference in orientation of the fast axis from pie segment to pie segment around the common optical axis. In this embodiment of the segmented chromatic wave plate, each pie segment covers a certain angle about the common optical axis. The orientation of the fast axis generally changes in equal steps from pie segment to pie segment, the total change in orientation over one turn about the common axis being 180° or a multiple of 180°.

It is to be noted that a lateral offset of the centre of the pie segments with regard to the common optical axis does not affect the intensity zero of the intensity distribution of the suppression light at the focus point but just tilts the donut shaped intensity distribution of the suppression light with regard to the common optical axis and slightly shifts the intensity zero laterally with regard to the geometric focus point. However, the intensity zero remains essentially at the focus point.

Preferably, the segmented chromatic $\lambda/2$ plate includes four pie segments of a same size and of a difference in orientation of the fast axis of 45° from pie segment to pie segment around the common optical axis. The minimum number of the pie segments of the segmented chromatic $\lambda/2$ plate is two. A particularly suitable number is four. With equal steps of the changes of the orientation of the fast axis, this number of segments corresponds to a change in orientation of the fast axis of 45° from pie segment to pie segment. If the number of pie segments is higher than 4, an even number of pie segments is also preferred.

The fast axis may rotate from pie segment to pie segment at a same sense of rotation as the corresponding segments are arranged around the common optical axis. If the beam of excitation light and the beam of suppression light are then linearly polarized before passing through the segmented chromatic $\lambda/2$ plate, the suppression of the spontaneously emitted fluorescent light becomes sensitive to a molecular orientation of the fluorophore, and the direction of molecular transition dipoles of the fluorophore can be investigated. This mode of operation of the new fluorescent light scanning microscope is here designated as MOM (Molecular Orientation Microscopy) or MOM-STED (Molecular Orientation Microscopy by STED).

If, however, the direction of the molecular dipoles of the fluorophore is not of interest, but a maximum spatial resolution of the new fluorescence light scanning microscope is to be achieved, it is preferred to rotate the fast axis from pie segment to pie segment at an opposite sense of rotation as compared to the sense of rotation at which the corresponding segments are arranged around the common optical axis. (The same effect may be achieved by adding a $\lambda/2$ plate downstream of a segmented $\lambda/2$ plate for which the fast axis rotates at the same sense of rotation as the corresponding segments are arranged around the common optical axis.) If the beam of excitation light and the beam of suppression light are then circularly polarized before passing through the segmented chromatic $\lambda/2$ plate, which may be achieved by an achromatic $\lambda/4$ plate, the suppression of fluorescent light spontaneously emitted by the fluorophore is independent of molecular orientation of the transition dipole of the fluorophore. This main mode of operation of the new fluorescent light scanning microscope is designated as easySTED here.

In order to enclose the intensity maximum of the excitation light at the focus point by intensity of the suppression light in direction of the common optical axis, the segmented chromatic $\lambda/2$ plate may additionally include ring segments surrounding the pie segments. These ring segments may have a same size and a same difference in orientation of the fast axis from ring segment to ring segment around the common optical axis.

Preferably, the birefringent chromatic optical element of the beam shaping device is adapted to shape the polarization distribution of the suppression beam over its beam cross section along a pupil plane of the objective. To this end, the birefringent chromatic optical element may be arranged in or close to a pupil plane of the objective. The pupil plane at which the birefringent chromatic optical element is arranged may be one directly in front of the objective (as viewed from the light source). It is also possible to select a pupil plane within the objective for the arrangement of the birefringent chromatic optical element. Particularly, it is not necessary to couple the detection path out between the objective and the birefringent chromatic optical element, if the fluorescent light to be detected is collected by the objective. Instead, the detector of the new fluorescent light scanning microscope may be arranged to detect fluorescence light spontaneously emitted by the fluorophore, collected by the objective and passed through the birefringent chromatic optical element.

If the light source of the new fluorescence light scanning microscope comprises a common laser source for providing both the beam of excitation light and the beam of suppression light, an intrinsic alignment of the beam of excitation light and the beam of suppression light will be achieved. Such a common laser source may be implemented by coupling two separate lasers into common optical fiber or by using a supercontinuum light source or another light source providing both the excitation light and suppression light (see for example WO 2009/047189 A1).

The birefringent chromatic optical element may provide for different polarization distributions of the suppression beam over its beam cross section to achieve the desired intensity distribution of the suppression light having an intensity zero at the focus point. Most of these polarization distributions will at any time be representable by a complex linear combination of an azimuthal polarization about the common optical axis (FIG. 7a), an azimuthal polarization about the common optical axis where the field vectors are inverted from pair to pair of opposing sectors arranged around the common optical axis (FIG. 7b), and a radial polarization with regard to the common optical axis where the field vectors are inverted from pair to pair of opposing sectors arranged around the common optical axis (FIG. 7c). In the latter case according to FIG. 7c, the sum of radially inward pointing vectors equals the sum of radially outward pointing vectors. A simple radial polarization distribution around the common optical axis, however, results in a z-component along the common optical axis of the suppression light in the focus point so that the desired intensity zero of the intensity distribution of the suppression light is not achieved. The term "complex linear combination" does not necessarily mean that the linear factors are in fact complex. i. e. both have a real and a imaginary part. They may have a real or imaginary part only, as both their real and imaginary parts may be zero (except of at least one part of at least one linear factor).

As already indicated the birefringent chromatic optical element of the new fluorescence light scanning microscope may comprise more than one or even a stack of a plurality of birefringent plates. It also has already been indicated, that the birefringent chromatic optical element may also comprise one or more achromatic birefringent plates besides the at least one chromatic birefringent plate.

In one embodiment of the birefringent chromatic optical element, two or more of the birefringent chromatic plates of the stack may be made of different birefringent chromatic optical materials which preferably feature opposite chromatic dispersion behaviors to provide for the desired chromatic properties of the birefringent chromatic optical element with a reduced sensitivity to the wavelengths of the beam of excitation light or the beam of suppression light or both of them. I. e. the birefringent chromatic optical element will for example let pass the beam of excitation light essentially unaltered or provide for the zero point of intensity of the suppression light at the focus point of the excitation light for different wavelengths of the excitation light or of the suppression light, respectively. With a suitable selection of the birefringent materials, the wavelengths of the excitation light or of the suppression light may vary within a range of 10 nm to some ten nm.

In another embodiment of the birefringent chromatic optical element, the stack may include a segmented birefringent achromatic λ/2 plate including four pie segments of a same size and of a difference in orientation of the fast axis of 45° from pie segment to pie segment around the common optical axis. In this segmented birefringent achromatic λ/2 plate, the pie segments opposing each other with regard to the optical axis feature a same directing of their fast axes, and the stack includes a bisected non-birefringent chromatic phase plate comprising two halves of different optical thicknesses adapted to delay the parts of beam of suppression light passing through two neighboring pie segments of the segmented birefringent achromatic λ/2 plate by (2n+1)λ/2 as compared to the parts of beam of suppression light passing through the two other neighboring pie segments of the segmented birefringent achromatic λ/2 plate. The bisected non-birefringent chromatic phase plate does not alter the phase distribution of all parts of the beam of excitation light passing through all the pie segments of the segmented birefringent achromatic λ/2 plate. Such a bisected non-birefringent chromatic phase plate may be easily adjusted to different wavelengths of the excitation light and of the suppression light by tilting it about a tilting axis running perpendicular to the contact area of its two halves. Although, this embodiment of the birefringent chromatic optical element does not include any birefringent chromatic optical plate, it features both birefringent and chromatic optical properties. Thus, the designation birefringent chromatic optical element as used in this application does not mean that the respective element must have a birefringent chromatic optical plate, but it must, as a whole, feature both birefringent and chromatic optical properties. On the other hand, any λ/2 plate referred to in this application is a birefringent phase plate unless indicated otherwise.

In a further embodiment of the new fluorescence light scanning microscope the birefringent chromatic optical element comprises a stack of a plurality of birefringent chromatic plates. Such an arrangement of a plurality of birefringent chromatic plates can, particularly, be used to shape the polarization distribution of the suppression beam over its beam cross section such that the polarization distribution comprises at least two polarization sub-distributions laterally offset with regard to the common optical axis, which result in at least two donut shaped intensity sub-distributions of the suppression light around the focus point, which are stretched along the common optical axis and which are tilted in different directions with regard to the common optical axis.

Most of the suitable polarization distributions achieved by the birefringent chromatic optical element in the new fluorescent light scanning microscope are such that an average polarization over the beam cross section of the beam of suppression light is zero at any time. This particularly applies to those polarization distribution indicated in FIG. 7 but it also applies to a polarization distribution achieved with a stack of segmented birefringent plates which will be further explained with reference to FIG. 9.

As already indicated, the new fluorescence light scanning microscope may comprise multiple spot arrangements, for example such as disclosed in International Patent Application published as WO/2006/108526. The multiple spot arrangement produces essentially complementary intensity patterns of the suppression light and of the excitation light in corresponding focal areas. Particularly, it produces an intensity distribution of the suppression light exhibiting multiple intensity zeros, and an intensity distribution of the excitation light having multiple maxima each essentially located at one of the intensity zeros. To make effective use of this arrangement, the detector has to be able to separately detect fluorescence light spontaneously emitted by the fluorophore located in the individual intensity zeros.

Figure 1:
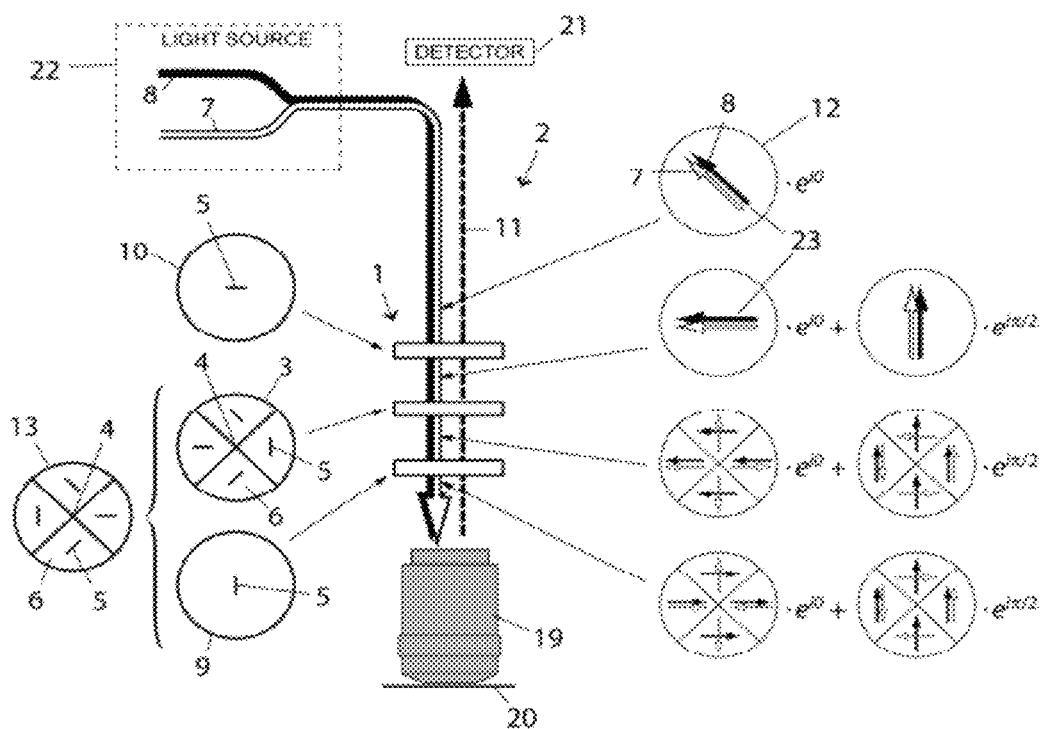

Referring now in greater detail to FIG. 1 of the drawings, the central part of the birefringent chromatic beam shaping device 1 of the new fluorescence light scanning microscope 2 is a segmented low-order wave plate 3 with the fast axes 5 of four pie segments 6 oriented as shown. The four pie segments 6 were cut from a single bigger wave plate in order to ensure a constant overall thickness. Subsequently, the four pie segments 6 were put together again by cementing them onto a common substrate (BK7), while observing the proper orientation of the fast axis 5. The orientation of the fast axes 5 is similar but not identical to the orientation suggested in [17] for generating an azimuthally polarized beam, and there is a difference in the number of segments. Two devices were manufactured, one for performing STED at 647 nm (line from an argon-krypton laser) and one for STED at 592 nm suppression wavelength (rendered by a frequency-doubled fiber laser). The utilized excitation wavelengths are 532 nm and 504 nm, respectively. In both cases, the retardation of the respective wave plate 3 is 2.5λ for the STED beam and ~3λ for the excitation beam. Thus the wave plate 3 effectively is a chromatic λ/2 plate only shaping the STED beam. As a result, the STED beam 7 experiences a half-wave retardation leading to a rotation of the polarization plane, whereas the excitation beam 8 is unaffected. In combination with an achromatic half wave plate 9, donut focusing is achieved for the STED wavelength, while the excitation beam 8 is focused to a regular nearly diffraction limited focal spot.

Additionally, an achromatic quarter wave plate 10 ensures that all molecules are effectively excited and quenched, regardless of their orientation (easySTED). Provided that only the segmented wave plate 3 is employed and the two achromatic retarders 9 and 10 are left out, the suppression or depletion process becomes sensitive to molecular orientation and the direction of molecular dipoles can be investigated. This way, with a simple conversion, the beam shaping device can be used both for isotropic resolution enhancement and for directionality assays. If the latter is not desired, the segmented chromatic wave plate 3 and the plain achromatic half wave plate 9 can be combined into a single segmented chromatic half wave plate 13.

The right hand side of FIG. 1 depicts the polarization direction of the STED beam 7 and the excitation beam 8 over the beam cross sections 12 at several positions in the beam shaping device 1 and at two different points $e^{i0}$ and $e^{i\pi/2}$ of the wave cycle. First, both linearly polarized beams are circularly polarized by the achromatic quarter wave plate 10. Then, the polarization is selectively rotated for the STED beam 7 only by the segmented wave plate 3. At this stage, the STED beam 7 is radially polarized for phases $\phi=0$ and azimuthally polarized for $\phi=\pi/2$, with both polarization states being unfavorable for STED microscopy. The final λ/2 retarder 9 selectively flips the horizontally polarized components of both beams 7 and 8, reversing the circular polarization of the excitation beam 8 and turning the STED beam 7 into a donut for all points of the wave cycle.

Figure 2:
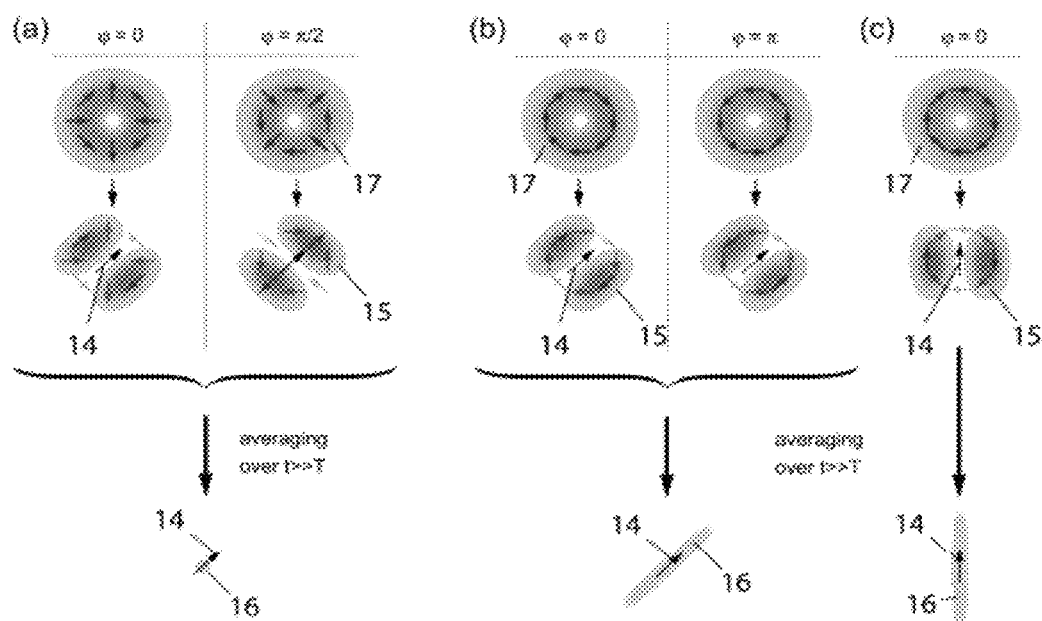

FIG. 2a shows the electric field of the polarization distribution 17 in the STED donut in the focal plane (top row). While for $\phi=0$, the intensity distribution is ring-like with a central zero (indicating good STED performance), the field distribution causes the effective excited state depletion pattern or STED-PSF 15 to depend on the orientation or molecular transition dipole 14 of the fluorophore about to be quenched. In our example, the state of the molecule oriented at 45° will be depleted most effectively by the upper left and by the lower right portion of the STED-beam where the electric field in 17 is parallel to the transition dipole 14. In contrast, the regions where the E-field in 17 is polarized perpendicularly do not act on the molecule. This leads to high resolution only in regions to the left and to the right of the dipole. However, with $\phi=\pi/2$, resulting from the action of the first quarter wave plate, the polarization distribution is rotated by 90° and the resolution is enhanced in a direction along the dipole orientation. Thus, when averaging over many cycles, one obtains high optical resolution in all directions in that the resultant emission 16 is delimited to a spot in all directions of the focal plane.

Note that the electric field distribution shown in FIG. 2*a* is in principle the same as in a donut created using a vortex phase element that has become the quasi-standard for STED microscopy. In addition, our beam shaping device allows the incoming STED light to be both left and right circularly polarized after the first achromatic quarter wave plate as can be seen when tracing the right side of FIG. 1 with different orientations of the polarization. This is an important point, as it allows one to easily combine two STED-sources via a polarizing beam splitter in order to double the available STED power. Standard vortex phase plates and the phase plate described in [16] cannot forge both the resulting polarization directions into a donut; instead the STED beam path will have to be split up again with all the negative effects on beam alignment. In contrast, the segmented wave plate 3 (as well as the segmented wave plate 13) generates a donut regardless of the incoming polarization.

At first sight, the polarization pattern for a donut shown in FIGS. 1 and 2*a* appears to be unnecessarily complex. It seems much simpler to employ an azimuthally polarized beam as suggested in [17], because azimuthal polarization in the back focal plane will transform into a focal intensity distribution with a central minimum. In practice, however, this distribution of the electric field in the focal plane is unfavorable for STED, because the transition to the ground state, i.e. the depletion of the excited state of an azimuthally polarized donut depends on the orientation of the fluorescent molecules [18-21]. On the other hand, this means that such a donut is of great use when it comes to finding out the actual direction of molecular dipoles.

In fact, by leaving out the two achromatic non-segmented wave plates 9 and 10 in FIG. 1, STED becomes sensitive to molecular orientation. The resulting distribution of the electric field in the focal plane is discussed in FIG. 2*b, c* together with the effect on the detection PSF 15. Every molecule is quenched only in a direction perpendicular to its dipole 14. In directions along the dipole 14, regardless of its actual orientation, the STED-field 17 has no component parallel to the dipole 14 and thus cannot elicit a molecular transition, i.e. not effect the exited state depletion. In contrast to FIG. 2*a*, the parts of the donut where the molecule cannot be depleted are the same for all phases. Hence, the resulting resolution enhancement is not isotropic and this device can be used to investigate the orientation of fluorescent molecules in a sample, provided that the dipoles 14 are rotationally immobile over the course of a single frame of the detector. Thus, the new fluorescence light scanning microscope is suitable for directly mapping the molecular orientation.

Figure 3:
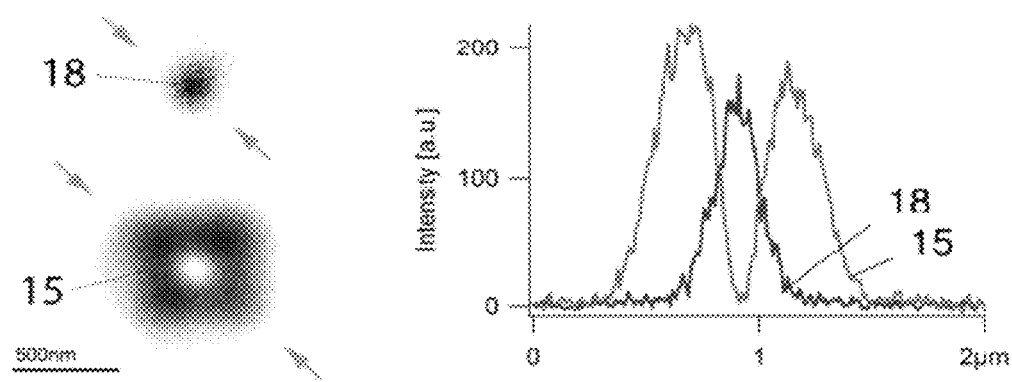

FIG. 3 shows the STED-PSF 15 and the excitation-PSF 18 in the focal plane and as line profiles. The images were obtained by scanning a 80 nm gold bead through the focal region (BBInternational, UK, prepared similarly to the fluorescent bead sample in [12]). Evidently, the STED beam is forged into a donut, while the excitation is a plain focal spot, as expected. The STED-PSF has a slight four-leafed appearance which is due to the four pie segments of the segmented wave plate. The modulation along the donut crest is <20% and has no practical impact on the STED performance, as is discussed below.

Figure 4:
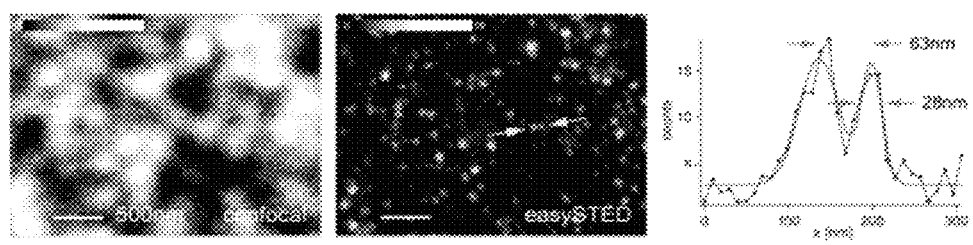

In FIG. 4, fluorescent beads stained with the fluorophore nile red (20 nm FluoroSpheres, Invitrogen, USA, sample preparation as in [12]) have been imaged both in standard confocal mode and with easySTED. The excitation wavelength was 532 nm, the STED beam was a modelocked 647 nm Ar/Kr beam (80 MHz repetition rate, ~200 ps pulse duration) with an intensity of ~200 MW/cm2 in the focal plane. The resolution enhancement provided by STED is obvious; the smallest features in the image indicate a resolution of ~30 nm, as can be inferred from a Gaussian fit to a line profile (see FIG. 4, right). The resolution is most likely limited by the available STED power. Most noteworthy, the resolution we obtain with a standard vortex phase plate on otherwise the same setup and the same sample is also in the 30 nm range. Furthermore, no asymmetries in the effective PSF are noticeable that might be expected due to the fact that the STED-PSF is not a pure donut mode (see FIG. 3). Altogether, this shows that the technical simplifications behind easySTED actually do not come at the cost of performance.

The fluorescence emission, whose maximum is close to the excitation line, is mostly left unaffected by the beam shaping device too, otherwise the signal would drop considerably at the confocal detection pinhole. Importantly, this allows the device to be installed directly behind the objective lens in the first place. Note that the confocal pinhole is needed only if 3D sectioning is required; the STED principle does not require confocality because the region from where the fluorescence originates is predefined by the position of the minimum of the STED beam.

Figure 5:
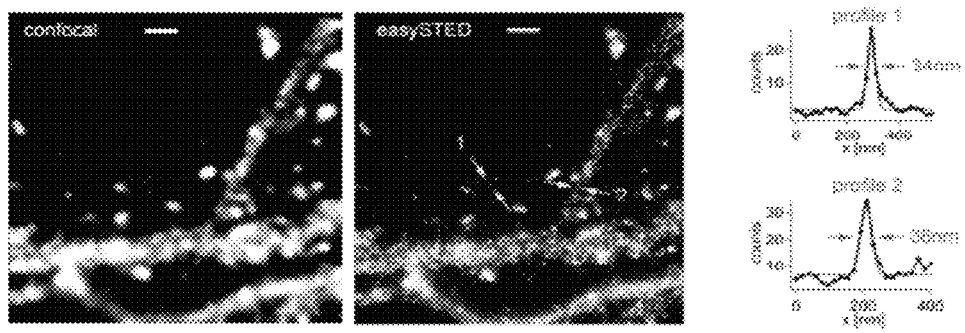

FIG. 5 shows images taken from hippocampal mouse neurons in standard confocal mode and with STED using our polarization beam shaping device. The presynaptic active zone protein bassoon was labelled with A565 dye (Atto-Tec, Germany). Beam parameters were the same as in FIG. 4. Again, easySTED reduces the area of the effective focal spot by a factor of ~40. For the easySTED image, the apparent size of unspecifically bound single antibodies indicates a lateral resolution of the STED microscope of around 35 nm. The average size of the protein features is 80 nm. Thus, the actual distribution of the protein bassoon and the shape of the active zone can be fully assessed.

Figure 6:
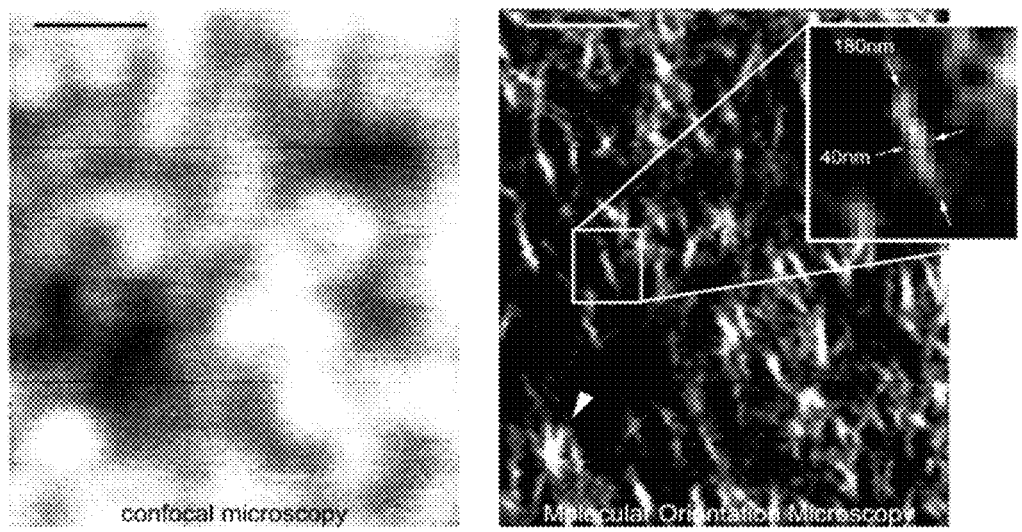

FIG. 6 shows MOM-STED as discussed in FIG. 2*b, c*. Single nile red molecules have been prepared by using the bead sample from above and bleaching an area with the excitation laser until a sufficiently low number of dye molecules were left in the beads. Thus, we obtain individual molecules surrounded and fixed in orientation by polystyrene, which we have found to be advantageous in terms of brightness and photostability. Furthermore, these beads provide us with a well-defined environment for the first demonstration of MOM. This sample was then imaged confocally and with STED using pure azimuthal polarization. The resulting molecular images depend on the orientation of their transition dipoles. To further reduce the number of visible molecules, we used linearly polarized excitation (vertically in FIG. 6) by exciting only molecules with a vertical dipole component. This explains the preferential orientation of the molecules in FIG. 6. When the polarization of the excitation beam is rotated, the dominant direction of the apparent molecules will rotate as well.

The magnification in the green box shows what, most likely, is a single molecule that has been resolved down to 40 nm perpendicular to its dipole direction; yet it has the 180 nm-width of a standard confocal spot image along the dipole. From this asymmetric image, the orientation of the dipole in the focal plane can be inferred. Furthermore, the ability to discern molecules which differ in their orientation means they could be individually imaged and counted even when their intermolecular distance is only a few nanometers or below. Assessing the orientation of molecules that are separated by a subdiffraction distance has so far been mostly impossible with current techniques, because they rely on the polarization of the emitted light. In contrast, operating with the polarization of illumination, MOM opens up an additional parameter for separation.

The arrow in FIG. 6 points to a situation where the molecules are so close together that most likely they could not have been resolved with an isotropic resolution of 40 nm. In contrast, MOM allows their differentiation due to clearly distinct image shapes. One could go as far as to fit with several elongated and appropriately rotated images in order to find the exact location of the emitters. As for biological specimens, there is considerable evidence [22] that they do indeed contain at least a fraction of fixed molecules, for example in fully assembled actin filaments and bundles, indicating that imaging the molecular orientation should become important.

As the wavelength-sensitive beam shaping device of the new fluorescence light scanning microscope has a different effect on the excitation-, emission- and the STED-beams, all beams can simultaneously pass the device. This facilitates intrinsic alignment when a common source is employed for excitation and for STED or when both beams are fed through the same optical fiber. This way, it consequently simplifies the assembly, maintenance, and operation of a STED microscope.

The beam shaping device itself consists mainly of a segmented half wave plate that can be easily manufactured from an off-the-shelf retarder in two steps using standard procedures. Straightforward and robust in production as well as in operation, the beam shaping device can be used to upgrade standard scanning fluorescence (confocal) microscopes by placing the device behind the objective lens and adding a laser that delivers the STED-beam.

Moreover, the presented results clearly indicate that a specific STED objective lens could be manufactured with a segmented wave plate already incorporated, similar to lenses for phase contrast microscopy.

Additionally, with a minor change, the new fluorescence light scanning microscope can be used for investigations on the orientation of fluorescent molecules. Reported methods for determining the orientation mostly rely on comparing the (rather complicated) defocused diffraction pattern to theoretical predictions and/or on special illumination/detection schemes [23-26] [27,28], for instance annular illumination. In any case, these methods demand a good signal-to-noise ratio and are a rather indirect. In contrast, MOM sorts out the molecular orientation directly in the sample and the orientation in the focal plane can be seen immediately from the image. A future application of MOM could be in the field of molecular motors. While much is known about their linear stepping, MOM would also allow one to find out about how the motor twists as it moves along its track.

Note that STED per se is, of course, not essential to this way of establishing molecular orientation. In fact, any saturable optical transition between two states can be used to establish molecular orientation in this way [10]. In other words, MOM using STED can be readily expanded to a MOM-RESOLFT concept where stimulated emission is replaced by an electron spin flip (triplet state transition) or the relocation of atoms such as a cis-trans photoisomerization, a reversible formation of chemical bonds, etc [10]. Clearly the same donuts and related versions thereof can be utilized in the RESOLFT approach. The importance of creating local minima in nanoscopy concepts based on separating features by coordinate-targeted switching (RESOLFT) underscores the importance of the birefringent elements and the specific minima reported herein [10]. Moreover, even if the spatial resolution does not suffice to resolve the molecules in space, as long as their dipole orientation differs, molecules can be separated and counted in a volume with high sensitivity.

Figure 7:
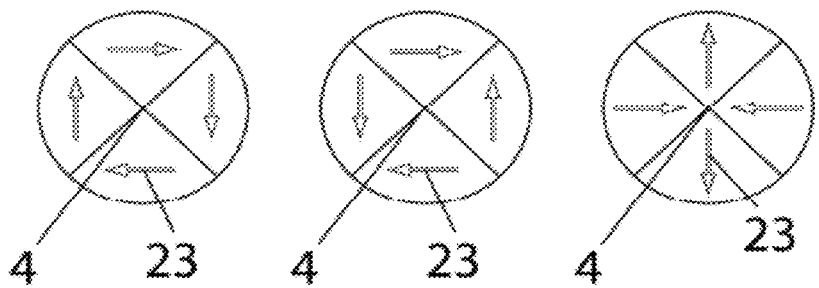
FIG. 7 shows three basic polarization distributions of the STED beam over its cross section in or near the back focal plane.

FIG. 7 shows three basic polarization distributions of the STED beam or beam of suppression light which each result in a zero point of the intensity of the suppression light at the focus point surrounded by a donut of intensity of the suppression light in the focal plane. These three polarization distributions about the common optical axis 4 may also be linearly combined without affecting the intensity zero at the focus point. Of the three polarization distributions depicted in FIG. 7 only the ones of FIG. 7B,C as such belong to the easySTED mode of the new fluorescence light scanning microscope whereas the distribution of FIG. 7A as such belongs to the MOM-mode. However, there are additional complex linear combinations of the polarization distributions across a pupil of the respective objective according to FIGS. 7A, B and C which also belong to the easySTED mode of operation.

Figure 8:
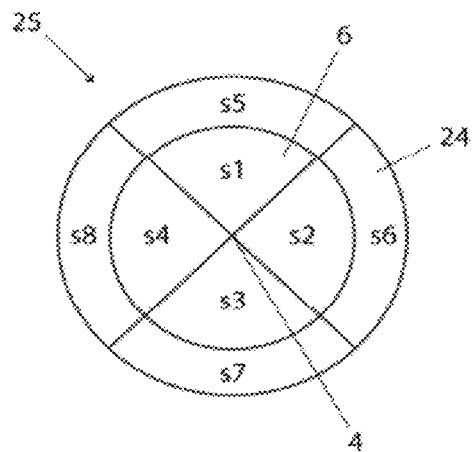
FIG. 8 shows a segmented chromatic λ/2 plate having pie segments in the middle and ring segments surrounding the pie segments.

FIG. 8 indicates a segmented $\lambda/2$ plate 3 comprising four ring segments 24 numbered s5 to s8 in addition to four pie segments 6 numbered s1 to s4 in the centre of the plate 3. The pie segments 6 taper towards the common optical axis 4, and each of them spans about an angle around the optical axis 4 of 90°. The ring segments 24 extent around the pie segments 6. The orientation of the fast axis within the segments s1 to s8 will be selected in such a way that an intensity zero of the intensity distribution of the suppression light at the focus point is both surrounded by a donut of intensity of the suppression light within the focal plane and enclosed by two maxima of the intensity of the suppression light arranged on both sides of the focal plane along the common optical axis 4.

Figure 9:
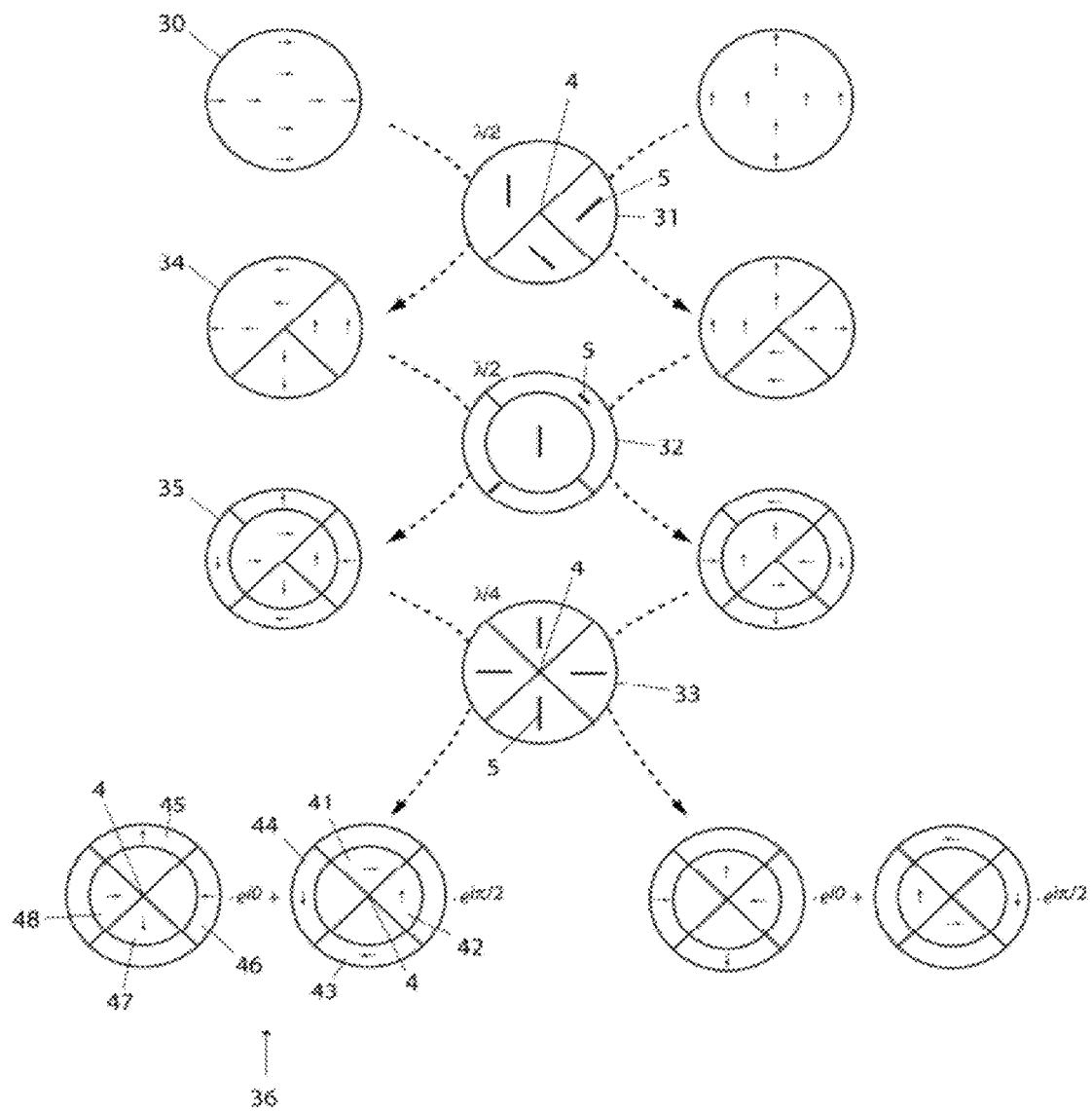
FIG. 9 shows a stack of segmented birefringent plates and the resulting polarization distributions of the STED beam.

FIG. 9 illustrates an easily producible stack of three birefringent chromatic wave plates 31, 32 and 33 and the corresponding polarization distributions 34, 35 and 36 of the suppression light over a pupil of the objective of the new fluorescent light microscope starting from a polarization distribution 30 of the beam of suppression light with linear horizontal polarization only. All wave plates 31 to 33 are segmented as depicted, wherein the segments feature the indicated fast axis 5. The representations of the polarization distributions 34 to 36 are only divided in segments for the purpose of explanation of the polarization distribution 36 finally achieved.

Birefringent chromatic wave plate 31 is a $\lambda/2$ plate of three segments. Two pie segments each cover about 90° about the common optical axis 4 and one pie segment covers 180° about the optical axis 4. Birefringent chromatic wave plate 32 is a $\lambda/2$ plate comprising a circular centre segment which is surrounded by two ring segments both extending over 180° around the common optical axis. Assuming a top hat beam profile and paraxial conditions the diameter of the circular center would be 0.7071. Since the beam profile usually is Gaussian and the high aperture beams produce axial polarization the inner diameter must be selected smaller in practice, around 0.625 of the pupil diameter, depending on the width of the incoming Gaussian beam.

The final birefringent chromatic wave plate 33 is a λ/4 plate consisting of four pie segments with radial orientations of their fast axes. The finally resulting polarization distribution 36 comprises two subdistributions over sectors 41 to 44 and 45 to 48, respectively, which each produce a donut of intensity with a zero point in the center around the same focus point but with tube-shaped intensity distributions extending along the common optical axis 4, and tilted in different directions with regard to the common optical axis so that the zero point at the focus point is in fact surrounded by intensity of the suppression light in all spatial directions including the direction of the common optical axis. All the wave plates 31 to 33 according to FIG. 9 only affect the polarization distribution of the beam of suppression light whereas they are not affecting the polarization distribution of the excitation light which thus still comprises an intensity maximum at the focus point.

Wave plate stacks according to FIG. 9 have been built and tested for suppression beams of suppression wavelengths of 647 nm and 755 nm and excitation beams of excitation wavelengths of 531 and 640 nm, respectively.

FIG. 10 indicates a stack forming a birefringent chromatic element and consisting of a segmented achromatic λ/2 plate 49 and a bisected non-birefringent chromatic phase plate 50. The segmented achromatic λ/2 plate 49 comprises four pie segments 6. The fast axis changes from pie segment to pie segment in the circumferential direction about the optical axis 4 by 45°. However, the fast axes have the same direction in those pie segment 6 that oppose each other with regard to the optical axis 4. The non-birefringent chromatic phase plate 50 is bisected into two halves which display a difference in optical delay of (2n+1)λ/2 or (2n+1)180° for the STED or suppression beam, wherein n is an integer. If the segmented achromatic λ/2 plate 49 is combined with the non-birefringent chromatic phase plate 50, they have the same effect on the STED or suppression beam as the segmented chromatic λ/2 plate 13 already depicted in FIG. 1 and also shown on the right hand side of FIG. 10. On the other hand, the two halves of the bisected non-birefringent chromatic phase plate 50 display a difference in optical delay of any multiple of λ for the STED or suppression beam. Thus, the bisected non-birefringent chromatic phase plate 50 has no effect on the excitation light. This means that the excitation light is only affected by the segmented achromatic λ/2 plate 49. The bisected non-birefringent chromatic phase plate 50 may be easily adjusted to different wave lengths of the STED beam and the excitation beam by tilting it about any axis 51 running perpendicular to the contact area of its two halves. Although neither the segmented achromatic λ/2 plate 49 nor the bisected non-birefringent chromatic phase plate 50 are both birefringent and chromatic, their combination is both birefringent and chromatic.

FIG. 11(a) shows the intensity distribution 52 of an excitation beam 8 which passed through the combination of the segmented achromatic λ/2 plate 49 and the bisected non-birefringent chromatic phase plate 50 according to FIG. 10 in focal plane of an objective focussing this beam. The beam 8 is only affected by the segmented achromatic λ/2 plate 49 which slightly deforms its intensity distribution in the focal plane but leaves a maximum around the geometric focus point. FIG. 11(b) shows the intensity distribution 53 of the STED beam 7 over the same focal plane as in FIG. 11(a). This intensity distribution 53 is shaped by the combination of the plates 49 and 50 according to FIG. 10 or by the segmented chromatic λ/2 plate 13, respectively.

FIG. 12 indicates a combination of two segmented chromatic λ/2 plates 54 and 55 which both display the same basic distribution of the fast axes 5 over their segments 6 as the segmented chromatic λ/2 plate 13 according to FIG. 1. However, the two segmented chromatic λ/2 plates 54 and 55 are made of chromatic optical material of different dispersion behavior. Further, the distribution of the fast axis 5 is rotated about the optical axis 4 by 90° between the two segmented chromatic λ/2 plates 54 and 55 here; other rotation angles will also be suitable depending on the actual details of the plates 54 and 55. Suitable selections of the materials and thicknesses of the two segmented chromatic λ/2 plates 54 and 55 result in the desired zero effect on the excitation light 8 but nevertheless in the desired shaping effect to the STED beam with regard to its polarization distribution.

For example, a combination of segmented chromatic λ/2 plate 54 made of calcite and having a thickness of 1761.73 μm and of a segmented chromatic λ/2 plate 55 made of beta-BBO and having a thickness of 2586.35 μm result in a zero point of intensity of the STED beam at the focal point of the excitation beam 8 for wavelengths of the STED beam between 725 and 775 nm as well as for a wavelength of about 592 nm. Simultaneously, the maximum intensity distribution at the focal point of the excitation beam 8 is present for wavelengths of the excitation beam 8 of about 488 nm, of about 510 nm and between 615 nm and 645 nm. Another possible combination of the same materials is a segmented chromatic λ/2 plate 54 made of calcite and having a thickness of 1453.60 μm and a segmented chromatic λ/2 plate 55 made of beta-BBO and having a thickness of 2133.74 μm. This combination i. a. results in a possible wavelength range of 725 nm to 775 nm for the STED beam 7 and of 625 nm to 655 nm for the excitation beam 8. Consequently, the whole possible range of wavelengths of the STED beam 7 and the excitation beam 8 may be covered with just a few of such combinations of segmented chromatic λ/2 plates of opposite chromatic dispersion.

Many variations and modifications may be made to the embodiments of the invention without departing substantially from the spirit and principles of the invention. All such modifications and variations are intended to be included herein within the scope of the present invention, as defined by the following claims.

Non-Patent Literature References
1. S. W. Hell, and J. Wichmann, "Breaking the diffraction resolution limit by stimulated emission: stimulated-mission-depletion fluorescence microscopy," Opt. Lett. 19(11), 780-782 (1994).
2. T. A. Klar, S. Jakobs, M. Dyba, A. Egner, and S. W. Hell, "Fluorescence microscopy with diffraction resolution barrier broken by stimulated emission," Proc. Natl. Acad. Sci. U.S.A. 97(15), 8206-8210 (2000).
3. E. Betzig, G. H. Patterson, R. Sougrat, O. W. Lindwasser, S. Olenych, J. S. Bonifacino, M. W. Davidson, J. Lippincott-Schwartz, and H. F. Hess, "Imaging intracellular fluorescent proteins at nanometer resolution," Science 313(5793), 1642-1645 (2006).
4. M. J. Rust, M. Bates, and X. W. Zhuang, "Sub-diffraction-limit imaging by stochastic optical reconstruction microscopy (STORM)," Nat. Methods 3(10), 793-795 (2006).
5. M. G. L. Gustafsson, "Surpassing the lateral resolution limit by a factor of two using structured illumination microscopy," J. Microsc. 198(Pt 2), 82-87 (2000).
6. G. Donnert, J. Keller, R. Medda, M. A. Andrei, S. O. Rizzoli, R. Lührmann, R. Jahn, C. Eggeling, and S. W. Hell, "Macromolecular-scale resolution in biological fluorescence microscopy," Proc. Natl. Acad. Sci. U.S.A. 103 (31), 11440-11445 (2006).

7. V. Westphal, and S. W. Hell, "Nanoscale resolution in the focal plane of an optical microscope," Phys. Rev. Lett. 94(14), 143903 (2005).
8. E. Rittweger, K. Y. Han, S. E. Irvine, C. Eggeling, and S. W. Hell, "Sted microscopy reveals crystal colour centres with nanometric resolution," Nat. Photonics 3(3), 144-147 (2009).
9. D. Wildanger, R. Medda, L. Kastrup, and S. W. Hell, "A compact STED microscope providing 3D nanoscale resolution," J. Microsc. 236(1), 35-43 (2009).
10. S. W. Hell, "Far-field optical nanoscopy," Science 316 (5828), 1153-1158 (2007).
11. J. Keller, A. Schönle, and S. W. Hell, "Efficient fluorescence inhibition patterns for RESOLFT microscopy," Opt. Express 15(6), 3361-3371 (2007).
12. B. Harke, J. Keller, C. K. Ullal, V. Westphal, A. Schönle, and S. W. Hell, "Resolution scaling in STED microscopy," Opt. Express 16(6), 4154-4162 (2008).
13. D. Wildanger, E. Rittweger, L. Kastrup, and S. W. Hell, "STED microscopy with a supercontinuum laser source," Opt. Express 16(13), 9614-9621 (2008).
14. N. Bokor, Y. Iketaki, T. Watanabe, and M. Fujii, "Compact fluorescence depletion microscope system using an integrated optical element," Opt. Commun. 281(7), 1850-1854 (2008).
15. R. Menon, P. Rogge, and H. -Y. Tsai, "Design of diffractive lenses that generate optical nulls without phase singularities," J. Opt. Soc. Am. A 26(2), 297-304 (2009).
16. D. Wildanger, J. Bückers, V. Westphal, S. W. Hell, and L. Kastrup, "A STED microscope aligned by design," Opt. Express 17(18), 16100-16110 (2009).
17. G. Machavariani, Y. Lumer, I. Moshe, A. Meir, and S. Jackel, "Efficient extracavity generation of radially and azimuthally polarized beams," Opt. Lett. 32(11), 1468-1470 (2007).
18. M. Dyba, J. Keller, and S. W. Hell, "Phase filter enhanced STED-4Pi fluorescence microscopy: theory and experiment," N. J. Phys. 7,134 (2005).
19. N. Bokor, Y. Iketaki, T. Watanabe, K. Daigoku, N. Davidson, and M. Fujii, "On polarization effects in fluorescence depletion microscopy," Opt. Commun. 272(1), 263-268 (2007).
20. V. Westphal, C. M. Blanca, M. Dyba, L. Kastrup, and S. W. Hell, "Laser-diode-stimulated emission depletion microscopy," Appl. Phys. Lett. 82(18), 3125-3127 (2003).
21. P. Török, and P. Munro, "The use of Gauss-Laguerre vector beams in STED microscopy," Opt. Express 12(15), 3605-3617 (2004).
22. I. Testa, A. Schönle, C. von Middendorff, C. Geisler, R. Medda, C. A. Wurm, A. C. Stiel, S. Jakobs, M. Bossi, C. Eggeling, S. W. Hell, and A. Egner, "Nanoscale separation of molecular species based on their rotational mobility," Opt. Express 16(25), 21093-21104 (2008).
23. M. A. Lieb, J. M. Zavislan, and L. Novotny, "Single-molecule orientations determined by direct emission pattern imaging," J. Opt. Soc. Am. B 21(6), 1210-1215 (2004).
24. M. Böhmer, and J. Enderlein, "Orientation imaging of single molecules by wide-field epifluorescence microscopy," Opt. Soc. Am. B 20(3), 554-559 (2003).
25. P. Dedecker, B. Muls, J. Hofkens, J. Enderlein, and J. I. Hotta, "Orientational effects in the excitation and deexcitation of single molecules interacting with donut-mode laser beams," Opt. Express 15(6), 3372-3383 (2007).
26. D. Patra, I. Gregor, and J. Enderlein, "Image Analysis of Defocused Single-Molecule Images for Three-Dimensional Molecule Orientation Studies," J. Phys. Chem. A 108(33), 6836 (2004).
27. T. Ha, T. Enderle, S. Chemla, R. Selvin, and S. Weiss, "Single molecule dynamics studied by polarization modulation," Phys. Rev. Lett. 77(19), 3979-3982 (1996).
28. B. Sick, B. Hecht, and L. Novotny, "Orientational imaging of single molecules by annular illumination," Phys. Rev. Lett. 85(21), 4482-4485 (2000).

LIST OF REFERENCE NUMERALS

1—beam shaping device
2—Fluorescence light scanning microscope
3—segmented chromatic λ/2 plate
4—optical axis
5—fast axis
6—pie segment
7—STED beam
8—excitation beam
9—achromatic λ/2 plate
10—achromatic λ/4 plate
11—fluorescence light
12—beam cross section
13—segmented chromatic λ/2 plate
14—dipole
15—STED-PSF
16—emission
17—polarization distribution in donut
18—excitation-PSF
19—objective
20—sample
21—detector
22—light source
23—E-field direction
24—ring segment
25—segmented chromatic λ/2 plate
30—polarization distribution
31—segmented chromatic λ/2 plate
32—segmented chromatic λ/2 plate
33—segmented chromatic λ/4 plate
34—polarization distribution
35—polarization distribution
36—polarization distribution
41—sector of first subdistribution
42—sector of first subdistribution
43—sector of first subdistribution
44—sector of first subdistribution
45—sector of second subdistribution
46—sector of second subdistribution
47—sector of second subdistribution
48—sector of second subdistribution
49—segmented achromatic λ/2 plate
50—bisected non-birefringent chromatic phase plate
51—axis
52—intensity distribution
53—intensity distribution
54—segmented chromatic λ/2 plate
55—segmented chromatic λ/2 plate

The invention claimed is:

1. A fluorescence light scanning microscope, comprising a light source providing a beam of excitation light of an excitation wavelength for exciting a fluorophore in a sample to be imaged for spontaneous emission of fluorescence light, and providing a beam of suppression light of a suppression wavelength for suppressing spontaneous emission of fluorescence light by the fluorophore on a common optical axis of the beams of excitation light and suppression light, the suppression wavelength differing from the excitation wavelength;

an objective focusing both the beam of excitation light and the beam of suppression light into a focus volume around a focus point;

a detector adapted to detect fluorescence light spontaneously emitted by the fluorophore; and a chromatic beam shaping device arranged on the common optical axis of the beams of excitation light and suppression light, and including a chromatic optical element adapted to shape the beam of suppression light such as to produce an intensity distribution of the suppression light around the focus point having an intensity zero essentially at the focus point, and to leave a shape of the excitation light such as to produce an intensity distribution of the excitation light around the focus point having a maximum essentially at the focus point, wherein the chromatic optical element includes a birefringent chromatic optical element adapted to shape a polarization distribution of the beam of suppression light over its beam cross section.

2. The fluorescence light scanning microscope of claim 1, wherein the birefringent chromatic optical element comprises a segmented chromatic $\lambda/2$ plate including segments featuring different orientations of their fast axis.

3. The fluorescence light scanning microscope of claim 2, wherein the segmented chromatic $\lambda/2$ plate includes pie segments tapering towards the common optical axis which have a same size and a same difference in orientation of the fast axis from pie segment to pie segment around the common optical axis.

4. The fluorescence light scanning microscope of claim 3, wherein the segmented chromatic $\lambda/2$ plate includes four pie segments of a same size and of a difference in orientation of the fast axis of 45° from pie segment to pie segment around the common optical axis.

5. The fluorescence light scanning microscope of claim 4, wherein the fast axis rotates from pie segment to pie segment at a same sense of rotation as the corresponding segments are arranged around the common optical axis.

6. The fluorescence light scanning microscope of claim 5, wherein the beam of excitation light and the beam of suppression light are linearly polarized before passing through the segmented chromatic $\lambda/2$ plate.

7. The fluorescence light scanning microscope of claim 4, wherein the fast axis rotates from pie segment to pie segment at an opposite sense of rotation as compared to the sense of rotation at which the corresponding segments are arranged around the common optical axis, and wherein the segmented chromatic $\lambda/2$ plate is illuminated by a beam containing two orthogonal polarization d directions.

8. The fluorescence light scanning microscope of claim 1, wherein the birefringent chromatic optical element is adapted to shape the polarization distribution of the suppression beam over its beam cross section along a pupil plane of the objective.

9. The fluorescence light scanning microscope of claim 1, wherein the birefringent chromatic optical element is arranged essentially in a pupil plane of the objective.

10. The fluorescence light scanning microscope of claim 1, wherein the detector is arranged to detect fluorescence light spontaneously emitted by the fluorophore and collected by the objective.

11. The fluorescence light scanning microscope of claim 10, wherein the detector is arranged to detect fluorescence light which passed through the birefringent chromatic optical element.

12. The fluorescence light scanning microscope of claim 1, wherein the light source comprises a common laser source for providing both the beam of excitation light and the beam of suppression light.

13. The fluorescence light scanning microscope of claim 1, wherein the birefringent chromatic optical element is adapted to shape the polarization distribution of the suppression beam over its beam cross section such that the polarization distribution at any time is a complex linear combination of an azimuthal polarization about the common optical axis, of an azimuthal polarization about the common optical axis where the field vectors are inverted from pair to pair of opposing sectors arranged around the common optical axis, and of a radial polarization with regard to the common optical axis where the field vectors are inverted from pair to pair of opposing sectors arranged around the common optical axis.

14. The fluorescence light scanning microscope of claim 1, wherein the segmented chromatic $\lambda/2$ plate includes segments of ring shaped areas surrounding the pie segments.

15. The fluorescence light scanning microscope of claim 1, wherein the birefringent chromatic optical element comprises a stack of a plurality of birefringent plates.

16. The fluorescence light scanning microscope of claim 15, wherein the birefringent chromatic optical element comprises at least one chromatic birefringent plate and at least one achromatic birefringent plate.

17. The fluorescence light scanning microscope of claim 15, wherein the birefringent chromatic optical element comprises a stack of a plurality of birefringent chromatic plates.

18. The fluorescence light scanning microscope of claim 17, wherein two of the birefringent chromatic plates of the stack are made of different birefringent chromatic optical materials of different chromatic dispersion behavior.

19. The fluorescence light scanning microscope of claim 17, wherein the birefringent chromatic optical element is adapted to shape the polarization distribution of the suppression beam over its beam cross section such that the polarization distribution comprises at least two polarization sub-distributions laterally offset with regard to the common optical axis which result in at least two donut shaped intensity sub-distributions of the suppression light around the focus point which are stretched along the common optical axis and which are tilted in different directions with regard to the common optical axis.

20. The fluorescence light scanning microscope of claim 15, wherein the stack includes a segmented birefringent achromatic $\lambda/2$ plate including four pie segments of a same size and of a difference in orientation of the fast axis of 45° from pie segment to pie segment around the common optical axis, wherein the pie segments opposing each other with regard to the optical axis feature a same directing of their fast axes, and wherein the stack includes a bisected non-birefringent chromatic phase plate comprising two halves of different optical thicknesses adapted to delay the parts of beam of suppression light passing through two neighboring pie segments of the segmented birefringent achromatic $\lambda/2$ plate by $(2n+1)\lambda/2$ as compared to the parts of beam of suppression light passing through the two other neighboring pie segments of the segmented birefringent achromatic $\lambda/2$ plate, and to not alter the relevant phase distribution of all parts of the beam of excitation light passing through all the pie segments of the segmented birefringent achromatic $\lambda/2$ plate.

21. The fluorescence light scanning microscope of claim 1, wherein the birefringent chromatic optical element is adapted to shape the polarization distribution of the suppression beam such that an average polarization over its beam cross section is zero at any time.

22. The fluorescence light scanning microscope of claim 1, and further comprising a multiple spot arrangement adapted to produce an intensity distribution of the suppression light exhibiting multiple intensity zeros and an intensity distribution of the excitation light having multiple maxima each essentially located at one of the intensity zeros, wherein the detector is adapted to separately detect fluorescence light spontaneously emitted by the fluorophore located in the individual intensity zeros.

* * * * *